United States Patent
Park et al.

(10) Patent No.: US 10,362,570 B2
(45) Date of Patent: Jul. 23, 2019

(54) MULTICAST COMMUNICATION METHOD AND APPARATUS

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 65 days.

(21) Appl. No.: 15/672,408

(22) Filed: Aug. 9, 2017

(65) Prior Publication Data
US 2018/0077690 A1 Mar. 15, 2018

(30) Foreign Application Priority Data

Aug. 11, 2016 (KR) .................. 10-2016-0102630
Jun. 13, 2017 (KR) .................. 10-2017-0073684

(51) Int. Cl.
| H04W 72/04 | (2009.01) |
| H04L 12/18 | (2006.01) |
| H04W 72/00 | (2009.01) |
| H04W 76/40 | (2018.01) |
| H04L 5/00 | (2006.01) |
| H04W 4/70 | (2018.01) |

(Continued)

(52) U.S. Cl.
CPC ......... *H04W 72/042* (2013.01); *H04L 5/0053* (2013.01); *H04L 12/189* (2013.01); *H04W 72/005* (2013.01); *H04W 76/40* (2018.02); *H04W 4/70* (2018.02); *H04W 68/005* (2013.01); *H04W 68/02* (2013.01)

(58) Field of Classification Search
CPC . H04W 72/042; H04W 76/40; H04W 72/005; H04W 4/70; H04W 68/005; H04W 68/02; H04L 5/0053; H04L 12/189
See application file for complete search history.

(56) References Cited

U.S. PATENT DOCUMENTS

| 8,311,053 B2* | 11/2012 | Choi | ..................... H04W 52/54 |
| | | | 370/330 |
| 2015/0131591 A1* | 5/2015 | Liu | .......................... H04L 5/00 |
| | | | 370/329 |

(Continued)

OTHER PUBLICATIONS

LG Electronics Inc., "Proposed TP capturing solutions for DL broadcast enhancements", R2-164081, 3GPP TSG-RAN2 Meeting #94, Nanjing, China, Apr. 11-15, 2016, pp. 1-42.

(Continued)

*Primary Examiner* — Khaled M Kassim
(74) *Attorney, Agent, or Firm* — IP Legal Services, LLC (57) ABSTRACT

Provided are a method and apparatus for performing multicast communication in a communication system based on LTE or LTE-Advanced. The method of a UE includes receiving a Single Cell-Multicast Control CHannel (SC-MCCH) by monitoring a downlink channel based on a preset Downlink Control Information (DCI) format, determining a DCI format for receiving a Single Cell-Multicast Traffic CHannel (SC-MTCH) based on Coverage Enhanced Mode (CEMode) information included in the SC-MCCH, and receiving the SC-MTCH by monitoring the downlink channel based on the determined DCI format for receiving the SC-MTCH.

9 Claims, 4 Drawing Sheets

(51) Int. Cl.
*H04W 68/02* (2009.01)
*H04W 68/00* (2009.01)

(56) References Cited

U.S. PATENT DOCUMENTS

| | | | |
|---|---|---|---|
| 2015/0181577 A1* | 6/2015 | Moulsley | H04L 5/0053 |
| | | | 370/329 |
| 2016/0183231 A1* | 6/2016 | Shi | H04W 72/0446 |
| | | | 370/329 |
| 2017/0302465 A1* | 10/2017 | Wang | H04W 72/005 |
| 2018/0206289 A1* | 7/2018 | Kim | H04W 4/06 |
| 2018/0242278 A1* | 8/2018 | Xu | H04W 16/02 |
| 2018/0249442 A1* | 8/2018 | Xu | H04W 4/06 |
| 2018/0249481 A1* | 8/2018 | Xu | H04L 1/1896 |
| 2018/0279274 A1* | 9/2018 | Sun | H04L 1/18 |
| 2019/0007891 A1* | 1/2019 | Xu | H04W 4/06 |

OTHER PUBLICATIONS

LG Electronics, "Further details on enhancements for multi-cell multicast/broadcast", R1-164536, 3GPP TSG-RAN WG1 Meeting #85, Nanjing, China, May 23-27, 2016, pp. 1-4.

* cited by examiner

MULTICAST COMMUNICATION METHOD AND APPARATUS

CROSS REFERENCE TO RELATED APPLICATION

This application claims priority from Korean Patent Application Nos. 10-2016-0102630 & 10-2017-0073684, filed on Aug. 11, 2016 & Jun. 13, 2017, which are hereby incorporated by reference for all purposes as if fully set forth herein.

BACKGROUND OF THE INVENTION

1. Field of the Invention

The present disclosure relates to a multicast communication method and apparatus in a wireless communication system, and more particularly, to a method and apparatus for performing multicast communication in a communication system based on long term evolution (LTE) or LTE-Advanced.

2. Description of the Prior Art

As an LTE/LTE-Advanced network spreads, mobile operators seek to minimize the number of Radio Access Terminals (RATs) in order to reduce network maintenance costs.

However, due to abrupt increment in the number of typical global systems for mobile communication (GSM)/ general packet radio service (GPRS) network-based Machine Type Communication (MTC) products, mobile operators have to operate two RATs separately because they use both of the LTE/LTE-Advanced network for general data transmission and the GSM/GPRS network for MTC.

Therefore, in order to lower terminal costs compared to a typical LTE/LTE-Advanced terminal, limitations have been defined. For example, a transmission/reception bandwidth of the terminal is limited to 6 Physical Resource Blocks (PRBs), and a Bandwidth-reduced Low-complexity User Equipment (BL UE) is defined to have only one transmitting/receiving antenna. Further, a standard technique for supporting the BL UE is defined in a 3GPP Release-13.

In addition, a Coverage Enhancement (CE) mode is defined as a CE UE in consideration of MTC application scenarios such as smart metering installed in a 'deep indoor' environment such as a basement, and a standard technique for supporting the CE to UE is defined in the 3GPP Release-13.

Since a discussion on additional enhancement for a BL/CE UE defined in the 3GPP Release-13 will be made in 3GPP Release-14, a method and apparatus capable of performing multicast communication compared to the BL/CE UE of the 3GPP Release-13 is required.

SUMMARY OF THE INVENTION

In this background, an aspect of the present embodiment is to provide a method and apparatus for performing multicast communication in a wireless communication system.

In accordance with an aspect of the present embodiment, there is provided a method for performing multicast communication by a UE, including: receiving a Single Cell-Multicast Control CHannel (SC-MCCH) by monitoring a downlink channel based on a preset Downlink Control Information (DCI) format; determining a DCI format for receiving a Single Cell-Multicast Traffic CHannel (SC-MTCH) based on Coverage Enhanced Mode (CEMode) information included in the SC-MCCH; and receiving the SC-MTCH by monitoring the downlink channel based on the determined DCI format for receiving the SC-MTCH.

In accordance with another aspect of the present embodiment, there is provided a method for performing multicast communication by a base station, including: transmitting an SC-MCCH to a UE so that a downlink channel is monitored based on a preset DCI format; and transmitting an SC-MTCH to the UE so that the downlink channel is monitored based on a DCI format for receiving the SC-MTCH determined based on CEMode information included in the SC-MCCH.

In accordance with still another aspect of the present embodiment, there is provided a UE for performing multicast communication including: a reception unit, configured to receive an SC-MCCH by monitoring a downlink channel based on a preset DCI format, and to receive an SC-MTCH by monitoring the downlink channel based on a DCI format for receiving the SC-MTCH determined based on CEMode information included in the SC-MCCH; and a control unit configured to determine the DCI format for receiving the SC-MTCH based on the CEMode information included in the SC-MCCH.

In accordance with yet another aspect of the present embodiment, there is provided a base station for performing multicast communication including: a transmission unit configured to transmit an SC-MCCH to a UE so that a downlink channel is monitored based on a preset DCI format and to transmit an SC-MTCH to the UE so that the downlink channel is monitored based on a DCI format for receiving the SC-MTCH determined based on CEMode information included in the SC-MCCH; and a control unit configured to allow the CEMode information to be included in the SC-MCCH.

As described above, according to the embodiments of the present disclosure, it is possible to provide an effect of enabling multicast communication in a wireless communication system.

BRIEF DESCRIPTION OF THE DRAWINGS

The above and other objects, features and advantages of the present embodiment will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present embodiment, a detailed description of known functions and configurations incorporated herein will be omitted when it is determined that the description may make the subject matter of the present embodiment rather unclear.

In the present specifications, a Machine Type Communication (MTC) terminal refers to a low cost or low complexity terminal, a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE in wideband code division multiple access (WCDMA), LTE, high speed packet access (HSPA), and the like, and a Mobile Station (MS), a User Terminal (UT), a Subscriber Station (SS), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, a base station or a cell may be construed as an inclusive concept indicating a portion of an area covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like may be used. An embodiment of the present embodiment may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present embodiment may not be limited to a specific wireless communication field, and may include all technical fields in which the technical idea of the present embodiment is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed to configure an uplink and a downlink based on a single carrier or a pair of carriers. The uplink and the downlink may transmit control information through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), an Enhanced Physical Downlink Control CHannel (EPDCCH), and the like, and may be configured as a data channel, such as a Physical Downlink Shared CHannel (PDSCH), a Physical Uplink Shared CHannel (PUSCH), and the like, to transmit data.

Control information may be transmitted using an enhanced PDCCH or extended PDCCH (EPDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present embodiment, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission. The eNB may also transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, for convenience of description, multicast communication will be described based on an SC-PTM, but MBSFN transmission is also to be construed as falling within the scope of the present embodiment.

Figure 1:
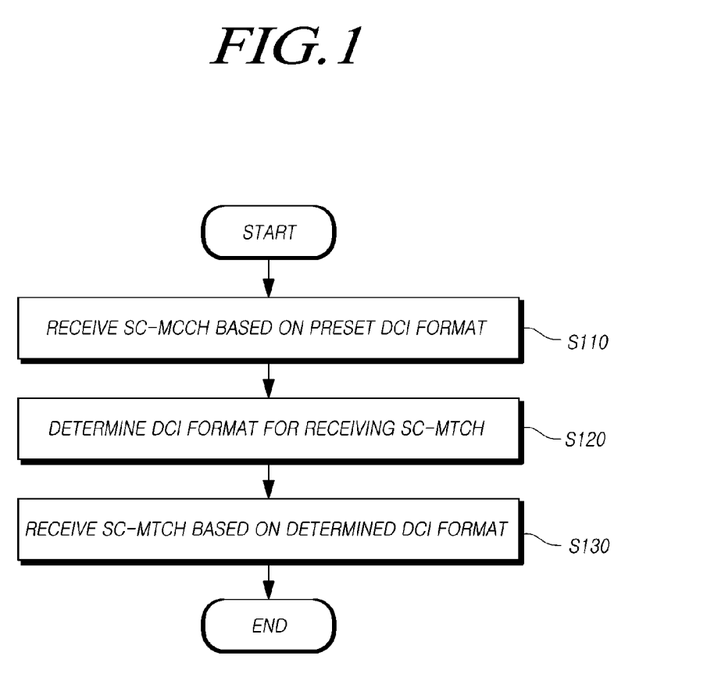
FIG. 1 is a diagram for explaining the operation of a UE that performs multicast communication according to an embodiment of the present disclosure.

FIG. 1 is a diagram for explaining the operation of a user equipment (UE) that performs multicast communication according to an embodiment of the present disclosure.

Referring to FIG. 1, in operation S100, the UE performing multicast communication receives a Single Cell-Multicast Control Channel (SC-MCCH) by monitoring a downlink channel based on a preset Downlink Control Information (DCI) format. For example, the UE may receive scheduling information of the SC-MCCH from a base station via a downlink control channel by performing monitoring based on the preset DCI format. In addition, the UE may receive the SC-MCCH from the base station via a downlink data channel based on the received scheduling information of the SC-MCCH. At this time, the preset DCI format may be the same as a DCI format for receiving a paging message. In this case, the preset DCI format may be a DCI format 6-2. Here, the SC-MCCH received via the downlink data channel includes Coverage Enhanced Mode (CEMode) information for a UE to receive a Single Cell-Multicast Traffic Channel (SC-MTCH). In addition, a Physical Downlink Control Channel (PDCCH) may be an MTC Physical Downlink Control Channel (MPDCCH), a Narrowband Physical Downlink Control Channel (NPDCCH), or the like.

Next, in operation S110, the UE determines a DCI format for receiving the SC-MTCH based on the CEMode information included in the SC-MCCH. Here, the CEMode information included in the SC-MCCH may be CEModeA or CEModeB. In this case, the DCI format for receiving the SC-MTCH may be determined to be a DCI format 6-1A when the CE mode included in the SC-MCCH is the CEModeA. In addition, the DCI format for receiving the SC-MTCH may be determined to be a DCI format 6-1B when the CE mode included in the SC-MCCH is the CEModeB.

Next, in operation S120, the UE receives the SC-MTCH by monitoring the downlink channel based on the determined DCI format for receiving the SC-MTCH. For example, the UE may receive scheduling information of the SC-MTCH via the downlink control channel by performing monitoring based on the determined DCI format for receiving the SC-MTCH. The UE may receive data via the downlink data channel based on the received scheduling information of the SC-MTCH.

As an example, the UE may be i) a UE set to allow access to a network service whose channel bandwidth is limited to 200 kHz or less or ii) a UE set to operate in a bandwidth limited to 6 Physical Resource Blocks (PRBs). That is, the UE may be a Bandwidth-reduced Low-complexity (BL) or Coverage Enhancement (CE) UE.

As an example, the UE may be i) a Narrowband Internet of Things (NB-IoT) UE that is defined to receive DCI via the NPDCCH or ii) a BL/CE UE that is set to receive DCI via the MPDCCH.

Figure 2:
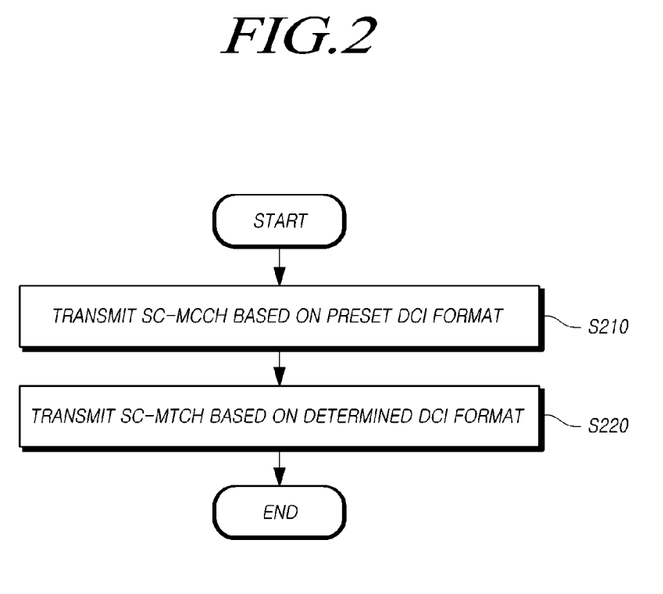
FIG. 2 is a diagram for explaining an operation of a base station that performs multicast communication according to an embodiment of the present disclosure.

FIG. 2 is a diagram for explaining the operation of a base station that performs multicast communication according to an embodiment of the present embodiment.

Referring to FIG. 2, in operation S200, the base station performing multicast communication transmits an SC-MCCH to a UE so that a downlink channel may be monitored based on a preset DCI format. For example, the base station may perform Cyclic Redundancy Check (CRC)-scrambling on scheduling information of the SC-MCCH based on a Single Cell-Radio Network Temporary Identifier (SC-RNTI) and transmit the scheduling information of the SC-MCCH on which CRC-scrambling has been performed to the UE, so that the UE may monitor the downlink channel based on the preset DCI format. The base station may transmit the SC-MCCH to the UE via a downlink data channel based on the scheduling information of the SC-MCCH transmitted to the UE. Here, the SC-MCCH may include CEMode information for receiving an SC-MTCH. In addition, the preset DCI format may be the same as a DCI format for receiving a paging message. At this time, the preset DCI format may be a DCI format 6-2.

Next, in operation S210, the base station transmits the SC-MTCH to the UE so that the downlink channel may be monitored based on the DCI format for receiving the SC-MTCH which is determined based on the CEMode information included in the SC-MCCH. The base station may perform CRC-scrambling on scheduling information of the SC-MTCH based on a G-RNTI and transmit the scheduling information of the SC-MTCH on which CRC-scrambling has been performed to the UE via a downlink control channel, so that the UE may receive the SC-MTCH via the downlink channel by performing monitoring based on the DCI format for receiving the SC-MTCH. The base station transmits the SC-MTCH to the UE via the downlink data channel based on the scheduling information of the SC-MTCH transmitted to the UE. Here, the CEMode information included in the SC-MCCH may be CEModeA or CEModeB. At this time, the DCI format for receiving the SC-MTCH may be determined to be a DCI format 6-1A when the CEMode information included in the SC-MCCH is the CEModeA. In addition, the DCI format for receiving the SC-MTCH may be determined to be a DCI format 6-1B when the CEMode information included in the SC-MCCH is the CEModeB.

As an example, the UE may be i) a UE set to allow access to a network service whose channel bandwidth is limited to 200 kHz or less or ii) a UE set to operate in a bandwidth limited to 6 PRBs. That is, the UE may be a BL or CE UE.

As an example, the UE may be i) an NB-IoT UE that is defined to receive DCI via an NPDCCH or ii) a BL/CE UE that is set to receive DCI via an MPDCCH.

Hereinafter, configurations of a UE and a base station capable of performing a part or the whole of the present embodiment will be described with reference to the drawings.

Figure 3:
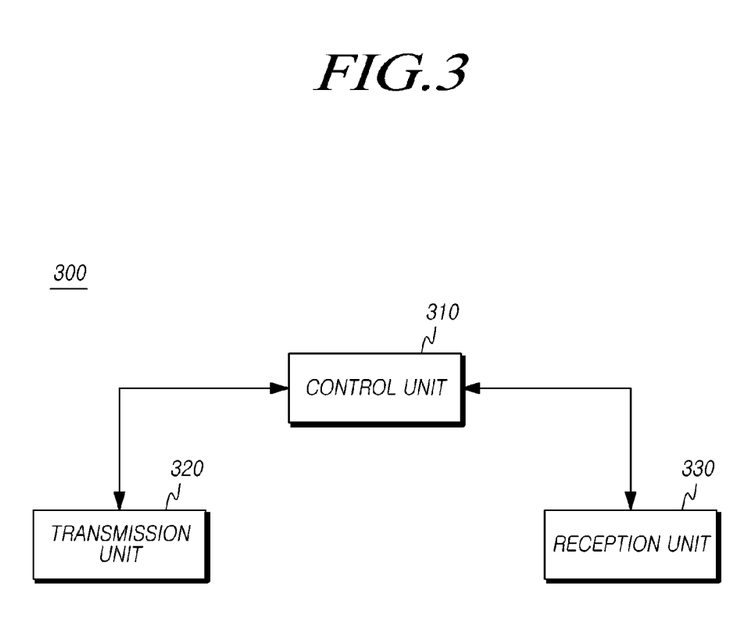
FIG. 3 is a diagram illustrating a UE according to an embodiment of the present disclosure.

FIG. 3 is a diagram illustrating the configuration of a UE according to an embodiment of the present embodiment.

Referring to FIG. 3, a UE 300 performing multicast communication may include a control unit 310 that determines a DCI format for receiving an SC-MTCH, a reception unit 320 that receives an SC-MCCH and an SC-MTCH via a downlink channel, and a transmission unit 330 that transmits signals, messages, or data necessary for carrying out the above-described present embodiment to a base station.

The control unit 310 may determine a DCI format for receiving the SC-MTCH based on CEMode information included in the SC-MCCH. Here, the CEMode information included in the SC-MCCH may be CEModeA or CEModeB. In this case, the DCI format for receiving the SC-MTCH may be determined to be a DCI format 6-1A when the CE mode included in the SC-MCCH is the CEModeA. In addition, the DCI format for receiving the SC-MTCH may be determined to be a DCI format 6-1B when the CE mode included in the SC-MCCH is the CEModeB. In addition, the control unit 310 may control the overall operation of the UE 300 for performing some or all of the present embodiments.

The reception unit 320 may receive the SC-MCCH by monitoring the downlink channel based on the preset DCI format. For example, the reception unit 320 may receive scheduling information of the SC-MCCH via a downlink control channel by performing monitoring based on the preset DCI format. In addition, the reception unit 320 may receive the SC-MCCH from the base station via a downlink data channel based on the received scheduling information of the SC-MCCH. At this time, the preset DCI format may be identical to a DCI format for receiving a paging message. In this case, the preset DCI format may be a DCI format 6-2. Here, the SC-MCCH received via the downlink data channel includes CEMode information for a UE to receive the SC-MTCH. In addition, a PDCCH may be an MPDCCH, an NPDCCH, or the like.

In addition, the reception unit 320 may receive the SC-MTCH by monitoring the downlink channel based on a DCI format for receiving the SC-MTCH determined based on the CEMode information included in the SC-MCCH. For example, the reception unit 320 may receive scheduling information of the SC-MTCH via the downlink control channel by performing monitoring based on the DCI format for receiving the determined SC-MTCH. The reception unit 320 may receive data via the downlink data channel based on the received scheduling information of the SC-MTCH.

As an example, the UE may be i) a UE set to allow access to a network service whose channel bandwidth is limited to 200 kHz or less or ii) a UE set to operate in a bandwidth limited to 6 PRBs. That is, the UE may be a BL or CE UE.

As an example, the UE may be i) an NB-IoT UE that is defined to receive DCI via the NPDCCH or ii) a BL/CE UE that is set to receive DCI via the MPDCCH.

Figure 4:
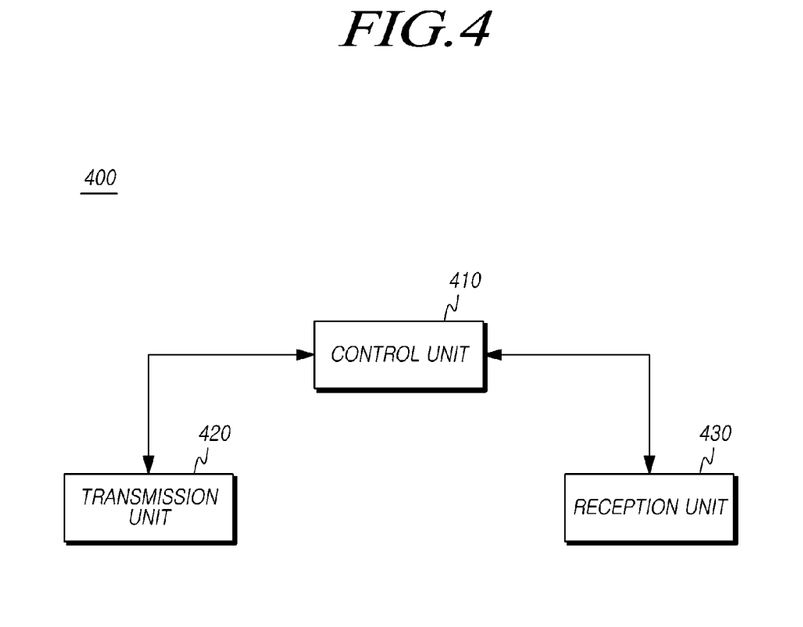
FIG. 4 is a diagram illustrating a base station according to an embodiment of the present disclosure.

FIG. 4 is a diagram illustrating a base station according to an embodiment of the present embodiment.

Referring to FIG. 4, a base station 400 performing multicast communication may include a control unit 410 that allows CEMode information to be included in an SC-MCCH, a reception unit 420 that receive signals, messages, or data necessary for carrying out the above-described present embodiment from a UE, and a transmission unit 430 that transmits an SC-MCCH to a UE and transmits an SC-MTCH to a UE.

The control unit 410 may allow the CEMode information to be included in the SC-MCCH. For example, the control unit 410 may allow the CEMode information included in the SC-MCCH, which can be set as CEModeA or CEModeB, to be included in the SC-MCCH. In addition, the control unit 410 may control the overall operation of the base station 400 for performing some or all of the present embodiments.

In the base station performing the multicast communication, the transmission unit 430 may transmit the SC-MCCH to a UE so that a downlink channel may be monitored based on a preset DCI format. For example, the transmission unit 430 may perform CRC-scrambling on scheduling information of the SC-MCCH based on an SC-RNTI and transmit the scheduling information of the SC-MCCH on which CRC-scrambling has been performed to the UE, so that the UE may monitor the downlink channel based on the preset DCI format. The transmission unit 430 may transmit the SC-MCCH to the UE via a downlink data channel based on the scheduling information of the SC-MCCH transmitted to the UE. Here, the SC-MCCH may include CEMode information for receiving an SC-MTCH. In addition, the preset DCI format may be identical to a DCI format for receiving a paging message. At this time, the preset DCI format may be a DCI format 6-2.

In addition, the transmission unit 430 may transmit the SC-MTCH to the UE so that the downlink channel may be monitored based on a DCI format for receiving the SC-MTCH determined based on the CEMode information included in the SC-MCCH. The transmission unit 430 may perform CRC-scrambling on scheduling information of the SC-MTCH based on a G-RNTI and transmit the scheduling information of the SC-MTCH on which CRC-scrambling has been performed to the UE via a downlink control channel, so that the UE may receive the SC-MTCH via the downlink channel by performing monitoring based on the DCI format for receiving the SC-MTCH. Thereafter, the transmission unit 430 may transmit the SC-MTCH to the UE via the downlink data channel based on the scheduling information of the SC-MTCH transmitted to the UE. At this time, the DCI format for receiving the SC-MTCH may be determined as a DCI format 6-1A when the CEMode information included in the SC-MCCH is the CEModeA. In addition, the DCI format for receiving the SC-MTCH may be determined as a DCI format 6-1B when the CEMode information included in the SC-MCCH is the CEModeB.

As an example, the UE may be a UE set to allow access to a network service whose channel bandwidth is limited to 200 kHz or less or a UE set to operate in a bandwidth limited to 6 PRBs. That is, the UE may be a BL or CE UE.

As an example, the UE may be i) an NB-IoT UE that is defined to receive DCI via an NPDCCH or ii) a BL/CE UE that is set to receive DCI via an MPDCCH.

BL UE and CE UE technologies have been standardized in 3GPP Release-12/13. A Low-Complexity (LC) UE may refer to a UE that is targeted for low-end applications such as low-revenue, low-speed, and low delay sensitivity, such as some MTCs. The LC UE may have reduced Tx and Rx capabilities compared to UEs in other categories. The BL UE may operate in an arbitrary LTE system bandwidth having a limited channel bandwidth of 6 PRBs, which is the maximum channel bandwidth available in a 1.4 MHz LTE system. The CE UE may require an enhanced coverage function to be connected to a cell.

NB-IoT technology has been standardized in 3GPP Release-13. The purpose of this standardization is to specify radio access for cellular IoT, which may include improved indoor coverage, support for large-scale low-speed UEs, low delay sensitivity, low UE costs, low power consumption, and an optimized network structure.

A Rel-13 BL/CE UE and an NB-IoT UE have been provided with functions to enable a 3GPP system to rapidly penetrate the low-cost IoT market. Accordingly, some functions provided to a general LTE UE providing a mobile broadband service were not provided to the Rel-13 BL/CE UE or the NB-IoT UE. For example, multicast transmission (or MBMS service or SC-PTM transmission; for convenience of explanation, description will be made based on SC-PTM, but MBSFN transmission is also included in the scope of the present embodiment) provided to general UEs was not provided to the Rel-13 BL/CE UE or the NB-IoT UE.

In LTE, MBMS transmission may use either MBSFN transmission or SC-PTM transmission. An MCE may determine whether to use SC-PTM or MBSFN for each MBMS session. In the SC-PTM, the MBMS may be transmitted in a single-cell coverage area. In the SC-PTM, an SC-MCCH and an SC-MTCH(s) may be provided. The SC-MCCH is a single control channel and the SC-MTCH(s) is one or more traffic channels. The SC-MCCH and the SC-MTCH(s) may be mapped on a DL-SCH (that is, PDSCH).

A UE is able to identify SC-MCCH transmission on the PDCCH using an SC-RNTI. Here, the SC-MCCH may refer to a control channel or control information for transmitting control information associated with MBMS transmission using the SC-PTM. The SC-MCCH can use a modification period. A notification mechanism may be used to announce changes in the SC-MCCH due to session initiation. The notification may be sent in a first sub-frame within a repetition period in which the SC-MCCH can be scheduled. The notification may be sent using a DCI format 1C based on a Single Cell Notification RNTI (SC-N-RNTI) and with one bit within an 8-bit bitmap. When receiving the notification, the UE may acquire the SC-MCCH in the same subframe. The UE may detect changes in the SC-MCCH that are not announced by the notification mechanism through SC-MCCH monitoring in the modification period.

[SC-PTM]

When a UE establishes an MBMS service through SC-MRB, the UE may acquire timing information for acquiring SC-MCCH information through a SystemInformation-BlockType20 (SIB20).

The UE receives PDSCH resource allocation information for SC-MCCH transmission by searching for a common search space on the PDCCH using an SC-RNTI. The UE receives SC-MCCH information through the corresponding PSDCH based on the received PDSCH resource allocation information. A base station broadcasts information for receiving the SC-MCCH information through the SIB20. Information included in the SIB20 contains i) sc-mcch-RepetitionPeriod information defining an interval between SC-MCCH information transmissions, ii) sc-mcch-Offset indicating a radio frame in which the SC-MCCH is scheduled, iii) sc-mcch-FirstSubframe information indicating a first subframe in which the SC-MCCH is scheduled, iv) sc-mcch-duration information indicating a time period during which the SC-MCCH can be scheduled, starting from the subframe indicated by sc-mcch-FirstSubframe, and the like. For example, the above-described SIB20 may be as follows.

An Information element SystemInformationBlockType20 may contain information required to acquire control information associated with transmission of MBMS using the SC-PTM.

TABLE 1

SystemInformationBlockType20 information element

```
--ASN1START

SystemInformationBlockType20-r13 ::= SEQUENCE {
    sc-mcch-RepetionPeriod-r13      ENUMERATED {rf2,rf4,rf8,rf16,rf32,rf64,rf128,rf256},
    sc-mcch-Offset-r13              INTEGER (0..10),
    sc-mcch-FirstSubframe-r13       INTEGER (0..9),
    sc-mcch-duration-r13            INTEGER (2..9)   OPTIONAL,
    sc-mcch-ModificationPeriord-r13 ENUMERATED {rf2,rf4,rf8,rf16,rf32,rf64,rf128,rf256,
                                                rf512,rf1024,r2048,rf4096,rf8192,rf16384,rf32768, rf65536},
    lateNonCriticalExtension        OCTET STRING                        OPTIONAL,
    ...
}
--ASN1STOP
```

TABLE 2

SystemInformationBlockType20 field descriptions sc-mcch-ModificationPeriod

Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on.

sc-mcch-duration

Indicates, starting from the subframe indicated by sc-mcch-FirstSubframe, the duration in subframes during which S C-MCCH may be scheduled in PDCCH sub-frames, see TS 36.321 [6]. Absence of this IE means that SC-MCCH is only scheduled in the subframe indicated by sc-mcch-FirstSubframe.

sc-mcch-Offset

Indicates, together with the sc-mcch-RepetitionPeriod, the radio frames in which SC-MCCH is scheduled i.e. SC-MCCH is scheduled in radio frames for which SFN mod sc-mcch-RepetitionPeriod = sc-mcch-Offset.

sc-mcch-FirstSubframe

Indicates the first subframe in which SC-MCCH is scheduled sc-mcch-RepetitionPeriod Defines the interval between transmissions of SC-MCCH information, in radio frames. Value rf2 corresponds to 2 radio frames, rf4 corresponds to 4 radio frames and so on.

[Search Space for SC-PTM]

Control information (SC-MCCH) and data information (SC-MTCH) for a UE, to which the SC-PTM is applied, may be respectively transmitted through the PDSCH. Here, the PDSCH resource allocation information may be CRC-scrambled, in the case of the control information (SC-MCCH), by the SC-RNTI through a common search space of the PDCCH, and the screamed PDSCH resource allocation information may be transmitted. Or, the PDSCH resource allocation information may be CRC-scrambled, in the case of the data information (SC-MTCH), by the G-RNTI, and the scrambled PDSCH resource allocation information may be transmitted. In addition, bitmap information related to a change notification for providing notification of a change in the SC-MCCH may be CRC-scrambled by an SC-N-RNTI through the common search space of the PDCCH and transmitted.

For example, the above-described UE search space and DCI format may be as follows.

When a UE is set to decode the PDCCH CRC-scrambled by the G-RNTI or the SC-RNTI by an upper layer, the UE should decode the PDCCH and the corresponding PDSCH as defined in Table 3 below. The start of scrambling of the PDSCH corresponding to the PDCCH depends on the G-RNTI or the SC-RNTI.

TABLE 3

PDCCH and PDSCH set by G-RNTI or SC-RNTI

| DCI format | Search Space | Transmission scheme of PDSCH corresponding to PDCCH |
| --- | --- | --- |
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

When a UE is set by an upper layer to decode the PDCCH CRC-scrambled by the SC-N-RNTI, the UE decodes the PDCCH as defined in Table 4.

TABLE 4

PDCCH set by SC-N-RNTI

| DCI format | Search Space |
| --- | --- |
| DCI format 1C | Common |

[CE Mode Definition]

In an LTE Rel-13 system, two modes, namely CEModeA and CEModeB, are defined as CE modes for a BL/CE UE or an NB-IoT UE. The CEModeA is a UE operation mode in which repetition is not applied to wireless channels such as MPDCCH, PDSCH, PUSCH, PUCCH, NPDCCH, NPDSCH, NPUSCH, etc., for the purpose of coverage enhancement of the BL/CE UE or the NB-IoT UE, or in which a small number of repetitions is applied to the wireless channels. In addition, the CEModeB is a UE operation mode in which a large number of repetitions is applied to the wireless channels for the purpose of coverage enhancement, and the corresponding CE mode is defined to be set for each UE and signaled. In each UE, transmission/reception operations of the UE such as a DCI format defined to monitor the corresponding downlink channel according to whether the CEModeA or CEModeB is set, the repetition number which can be set for each physical channel, etc., and the related L1/L2 or RRC parameters may be defined differently.

In an embodiment of the present embodiment, a method of supporting the CE mode for supporting the SC-PTM of the Rel-13 BL/CE UE or the NB-IoT UE is proposed.

According to a method of setting the CE mode of the Rel-13 BL/CE UE or the NB-IoT UE and a UE operation method therefor, the CE mode may be set as the CEModeA or CEModeB depending on a channel status of the UE. The DCI format may be defined for the UE to monitor the corresponding downlink channel through a UE-specific search space of the MPDCCH or the NPDCCH or a type-0, type-1, or type-2 common search space. Such a DCI format may be determined according to the corresponding CE mode setting. And, i) a setting range of RRC parameters related to physical channel transmission/reception such as the PDSCH or the NPDSCH set through higher-layer signaling, and ii) a maximum number of repetition transmissions for the PUSCH or the NPUSCH may be determined.

For example, when the CE mode is set as the CEModeA, the Rel-13 BL/CE UE may perform monitoring on MPDCCH candidates based on a DCI format 6-1A in order to receive a DCI that transmits PDSCH resource allocation information. In addition, when the CE mode is set as the CEModeB, the Rel-13 BL/CE UE may perform monitoring on MPDCCH candidates based on a DCI format 6-1B in order to receive a DCI that transmits PDSCH resource allocation information. However, in the case of paging, the Rel-13 BL/CE UE may perform monitoring on the MPDCCH candidates based on a DCI format 6-2 regardless of CEMode setting. In addition, a maximum number of PDSCH repetition transmissions set through the corresponding higher-layer signaling and the number of PDSCH repetition transmissions set through the DCI format 6-1A, 6-1B, or 6-2 according to the value of the maximum number of PDSCH repetition transmissions may have a different value depending on the CEMode setting value. However, in the case of paging, the number of PDSCH repetition transmissions may be present, where the number of PDSCH repetition transmission can be set through the DCI format 6-2.

For example, the maximum number of PDSCH repetition transmissions and the number of PDSCH repetition transmissions transmitted through the DL assignment DCI may be as shown in Tables 5 to 8.

TABLE 5

Setting value of maximum number of PDSCH repetition transmissions setting value according to CE mode

```
PDSCH-ConfigCommon-v1310 ::=   SEQUENCE {
    pdsch-maxNumRepetitionCEmodeA-r13     ENUMERATED {
                                          r16, r32 }         OPTIONAL,    -- Need OR
    pdsch-maxNumRepetitionCEmodeB-r13     ENUMERATED {
                                          r192, r256, r384, r512, r768, r1024,
                                          r1536, r2048}      OPTIONAL     -- Need OR
}
```

TABLE 6

PDSCH repetition levels (DCI format 6-1A)

| Higher layer parameter 'pdsch-maxNumRepetitionCEmodeA' | {n1, n2, n3, n4} |
|---|---|
| Not configured | {1, 2, 4, 8} |
| 16 | {1, 4, 8, 16} |
| 32 | {1, 4, 16, 32} |

TABLE 7

PDSCH repetition levels (DCI format 6-1B)

| Higher layer parameter 'pdsch-maxNumRepetitionCEmodeB' | {n1, n2, . . . , n8} |
|---|---|
| Not configured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

TABLE 8

PDSCH repetition levels (DCI format 6-2)

| 2-bit "DCI subframe repetition number" field in DCI Format 6-2 | {n1, n2, . . . , n8} |
|---|---|
| 00 | {1, 2, 4, 8, 16, 32, 64, 128} |
| 01 | {4, 8, 16, 32, 64, 128, 192, 256} |
| 10 | {32, 64, 128, 192, 256, 384, 512, 768} |
| 11 | {192, 256, 384, 512, 768, 1024, 1536, 2048} |

However, in the case of the NB-IoT UE unlike the BL/CE UE described above, the CE mode is not explicitly set, and only the DCI format between unicast and paging and the corresponding PDSCH transmission/reception procedure may be defined to be distinguished.

For example, a DCI format monitoring related configuration for NB-IoT and the number of PDSCH repetition transmissions may be set as shown in Tables 9 to 11 below.

TABLE 9

NPDCCH and NPDSCH configured by RA-RNTI

| DCI format | Search Space | Transmission scheme of NPDSCH corresponding to NPDCCH |
|---|---|---|
| DCI format N1 | Type-2 Common | If the number of NPBCH antenna ports is one, Single-antenna port, port 0 is used (see subclause 16.4.1.1), otherwise Transmit diversity (see subclause 16.4.1.2). |

TABLE 10

NPDCCH and NPDSCH configured by C-RNTI

| DCI format | Search Space | Transmission scheme of NPDSCH corresponding to NPDCCH |
|---|---|---|
| DCI format N1 | UE specific by C-RNTI | If the number of NPBCH antenna ports is one, Single-antenna port, port 0 is used (see subclause 16.4.1.1), otherwise Transmit diversity (see subclause 16.4.1.2). |

TABLE 11

Number of repetitions ($N_{Rep}$) for NPDSCH

| $I_{Rep}$ | $N_{Rep}$ |
| --- | --- |
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

In addition, when an SC-PTM service is applied to the BL/CE UE or the NB-IoT UE as described above, a gap may occur between the CE mode set at the corresponding UE and multicasting data, i.e., PDSCH transmission/reception for transmitting an SC-MTCH and transmission/reception of the MPDCCH or the NPDCCH for transmitting the corresponding PDSCH allocation information.

In an embodiment of the present disclosure, a method for defining and setting a separate CEMode for the SC-PTM is proposed for solving the problem.

Dual CE Mode Configuration

A CE mode for a multicasting channel (in the present disclosure, this is referred to as SC-CEMode in order to distinguish it from a typical CEMode) may be defined to be separately set, independent of an existing CE mode that is set to transmit and receive unicast control information and data information for a corresponding UE to a BL/CE UE or an NB-IoT UE supporting an arbitrary SC-PTM.

First Embodiment: RRC Signaling Based

It may be defined that a CE mode for receiving MPDCCH or PDSCH for SC-MCCH transmission/reception and receiving MPDCCH or PDSCH for SC-MTCH transmission/reception. Further, the CE mode is separately set and transmitted to a UE through UE-specific/cell-specific higher-layer signaling. In this case, a corresponding BL/CE UE or NB-IoT UE may configure CE mode setting information for multicast and UE operation and RRC setting parameter information for MPDCCH decoding according to the CE mode setting information for multicast, separately from CE mode setting information for unicast, and UE operation (e.g., monitoring DCI format) and RRC setting parameter information (e.g., maximum PDSCH repetition number) for MPDCCH decoding. For example, in the case in which an SC-CEMode for corresponding SC-PTM is set as an SC-CEModeB in order to provide the above-described SC-PTM service to an arbitrary BL/CE UE set as CEModeA, the UE may perform monitoring on the MPDCCH based on a DCI format 6-1B corresponding to CEModeB when performing monitoring on the MPDCCH to receive allocation information for the PDSCH that transmits the SC-MCCH or the SC-MTCH. In addition, the number of repetition transmissions of the PDSCH for transmitting SC-MCCH or SC-MTCH information may be set according to Table 7 of the above-described maximum number of PDSCH repetition transmissions. That is, when the PDSCH is configured, SC-pdsch-maxNumRepetitionCEmodeA and SC-pdsch-maxNumRepetitionCEmodeB for the SC-PTM may be set separately from the PDSCH setting RRC parameter for unicast, Thus, the maximum number of PDSCH repetition transmissions for the SC-PTM may be set.

At this time, according to the embodiment, definition can be made to follow an MPDCCH monitoring procedure and a setting procedure for the number of the PDSCH repetition transmissions for the above-described paging in addition to the corresponding CEModeA and CEModeB through RRC signaling for the SC-PTM.

Second Embodiment: Default Configuration

According to the embodiment, in a CE mode for SC-PTM of a BL/CE UE or for an NB-IoT UE, i) an MPDCCH or an NPDCCH and ii) a PDSCH or an NPDSCH for SC-PTM may always be configured based on CEModeB regardless of the above-described CE mode setting information for unicast. That is, when the BL/CE UE or the NB-IoT UE that supports the SC-PTM performs MPDCCH monitoring for receiving an SC-MCCH or an SC-MTCH, blind decoding may be performed based on a DCI format 6-1B defined for CEModeB. In addition, separate RRC parameter and SC-pdsch-maxNumRepetitionCEmodeB for determining the PDSCH repetition level for the SC-PTM may be set. Thus, a maximum number of repetition transmissions for the PDSCH for transmitting SC-MCCH or SC-MTCH information may be set. In addition, i) the MPDCCH or the NPDCCH and ii) the PDSCH or the NPDSCH for SC-PTM may always be set to follow a setting value for paging regardless of the CE mode setting information for unicast. That is, the BL/CE UE or the NB-IoT UE that supports the SC-PTM may perform monitoring on the MPDCCH or the NPDCCH based on a DCI format 6-2 or a DCI format N2 when performing monitoring on the MPDCCH for receiving the corresponding SC-MCCH or SC-MTCH, and the number of PDSCH repetition transmissions through DCI may be set to follow setting information for paging illustrated in Table 8.

Third Embodiment: Split Configuration for SC-MCCH and SC-MTCH

In the embodiment, a CE mode for SC-PTM of a BL/CE UE or an NB-IoT UE may be set to configure a separate CE mode with respect to SC-MCCH and SC-MTCH. For example, a CE mode for SC-MCCH and a CE mode for SC-MTCH may be independently set through UE-specific/cell-specific RRC signaling according to the above-described first embodiment, and may be independently set to follow the above-described MPDCCH monitoring procedure and a PDSCH repetition transmission/reception procedure. In addition, the SC-MCCH may be set to follow the CE mode and the MPDCCH monitoring procedure and PDSCH repetition transmission/reception procedure according to the CE mode based on the above-described default configuration method of the second embodiment, and a CE mode and PDSCH repetition transmission/reception procedure for SC-MTCH may be set through the SC-MCCH or a CE mode and PDSCH repetition transmission/reception procedure for corresponding SC-MTCH may be set through UE-specific/cell-specific RRC signaling.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present embodiment.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present embodiment have not been described for limiting purposes. The scope of the present embodiment shall be construed on the basis of the accompanying claims in such a manner that all of the technical ideas included within the scope equivalent to the claims belong to the present embodiment.

What is claimed is:

1. A method for performing multicast communication by a user equipment (UE), comprising:
    receiving a Single CellMulticast Control CHannel (SC-MCCH) by monitoring a downlink channel based on a preset Downlink Control Information (DCI) format;
    determining a DCI format for receiving a Single Cell-Multicast Traffic CHannel (SC-MTCH) based on Coverage Enhanced Mode (CEMode) information included in the SC-MCCH; and
    receiving the SC-MTCH by monitoring the downlink channel based on the determined DCI format for receiving the SC-MTCH,
    wherein the CEMode information included in the SC-MCCH is CEModeA or CEModeB, and
    wherein the DCI format for receiving the SC-MTCH is determined to be a DCI format 6-1A when the CEMode information included in the SC-MCCH is the CEModeA.

2. The method of claim 1, wherein the preset DCI format is the same as a DCI format for receiving a paging message.

3. The method of claim 2, wherein the preset DCI format is a DCI format 6-2.

4. The method of claim 1, wherein the DCI format for receiving the SC-MTCH is determined to be a DCI format 6-1 B when the CEMode information included in the SC-MCCH is the CEModeB.

5. The method of claim 1, wherein the UE is a UE defined to receive DCI via a Machine Type Communication (MTC) Physical Downlink Control Channel (MPDCCH) or a Narrowband Physical Downlink Control Channel (NPDCCH).

6. A UE for performing multicast communication comprising:
    a reception unit configured to receive an Single Cell-Multicast control channel (SC-MCCH) by monitoring a downlink channel based on a preset downlink control information (DCI) format and to receive an single cell-multicast traffic control channel (SC-MTCH) by monitoring the downlink channel based on a DCI format for receiving the SC-MTCH determined based on coverage enhanced mode (CEMode) information included in the SC-MCCH; and
    a control unit comprising a processor configured to determine the DCI format for receiving the SC-MTCH based on the CEMode information included in the SC-MCCH,
    wherein the CEMode information included in the SC-MCCH is CEModeA or CEModeB, and
    wherein the DCI format for receiving the SC-MTCH is determined to be a DCI format 6-1A when the CEMode information included in the SC-MCCH is CEModeA.

7. The UE of claim 6, wherein the preset DCI format is the same as a DCI format for receiving a paging message.

8. The UE of claim 6, wherein the DCI format for receiving the SC-MTCH is determined to be a DCI format 6-1 B when the CEMode information included in the SC-MCCH is CEModeB.

9. The UE of claim 6, wherein the UE is a UE defined to receive DCI via an MPDCCH or an NPDCCH.

* * * * *